US010341128B2

(12) United States Patent
Seetharaman et al.

(10) Patent No.: US 10,341,128 B2
(45) Date of Patent: Jul. 2, 2019

(54) METHOD AND SYSTEM FOR OPTIMIZING USAGE OF NETWORK RESOURCES IN A COMMUNICATION NETWORK

(71) Applicant: Wipro Limited, Bangalore (IN)

(72) Inventors: Swaminathan Seetharaman, Chennai (IN); Ramesh Madhavan, Chennai (IN)

(73) Assignee: Wipro Limited, Bangalore (IN)

( * ) Notice: Subject to any disclaimer, the term of this patent is extended or adjusted under 35 U.S.C. 154(b) by 416 days.

(21) Appl. No.: 15/078,428

(22) Filed: Mar. 23, 2016

(65) Prior Publication Data

US 2017/0264449 A1    Sep. 14, 2017

(30) Foreign Application Priority Data

Mar. 12, 2016    (IN) .............................. 201641008685

(51) Int. Cl.
*G06F 15/16*    (2006.01)
*H04L 12/18*    (2006.01)
(Continued)

(52) U.S. Cl.
CPC ...... *H04L 12/1827* (2013.01); *H04L 12/1818* (2013.01); *H04L 45/3065* (2013.01);
(Continued)

(58) Field of Classification Search
CPC ............. H04L 12/1827; H04L 12/1818; H04L 45/3065; H04L 47/801; H04L 65/1069;
(Continued)

(56) References Cited

U.S. PATENT DOCUMENTS

| 5,951,694 A | 9/1999 | Choquier et al. |
| 7,707,296 B2 | 4/2010 | De Oliveira |

(Continued)

FOREIGN PATENT DOCUMENTS

| EP | 2 053 869 A1 | 4/2009 |
| WO | WO 2015/094039 | 6/2015 |

OTHER PUBLICATIONS

IN 4763 CHE 2015, Wipro, Sep. 25, 2015, pp. 1-38.
(Continued)

*Primary Examiner* — Jeffrey R Swearingen
*Assistant Examiner* — Oluwatosin M Gidado
(74) *Attorney, Agent, or Firm* — Finnegan, Henderson, Farabow, Garrett & Dunner, LLP

(57) ABSTRACT

The present disclosure relates to a method and system for optimizing usage of network resources in the communication network. In an embodiment, a session is initiated by a user with a plurality of media servers. The usage of the network resources is optimized by a routing server which monitors session characteristics of an on-going session, user characteristics, media server characteristics and network conditions, wherein the on-going session is hosted by a plurality of session handling media servers from the plurality of media servers in the communication network. The routing server further compares the monitored data with corresponding threshold values and identifies at least one media server which violates the pre-defined threshold. The routing server further identifies one or more alternate media servers based on the media server characteristics and transfer the connectivity of one or more users to the one or more alternate media servers without disconnecting the on-going session.

20 Claims, 10 Drawing Sheets

(51) Int. Cl.
*H04L 12/725* (2013.01)
*H04L 12/927* (2013.01)
*H04L 29/06* (2006.01)
*H04L 29/08* (2006.01)
*H04L 12/24* (2006.01)
*H04L 12/26* (2006.01)

(52) U.S. Cl.
CPC ........ *H04L 47/801* (2013.01); *H04L 65/1069* (2013.01); *H04L 65/1083* (2013.01); *H04L 65/403* (2013.01); *H04L 67/101* (2013.01); *H04L 67/1008* (2013.01); *H04L 67/1027* (2013.01); *H04L 67/148* (2013.01); *H04L 12/189* (2013.01); *H04L 41/0816* (2013.01); *H04L 43/08* (2013.01)

(58) Field of Classification Search
CPC . H04L 65/1083; H04L 65/403; H04L 67/148; H04L 12/189; H04L 41/0816; H04L 43/08
USPC .......................................................... 709/204
See application file for complete search history.

(56) References Cited

U.S. PATENT DOCUMENTS

| | | | | |
|---|---|---|---|---|
| 7,978,626 | B1* | 7/2011 | Khanka | H04L 1/1635 370/230 |
| 9,167,098 | B1 | 10/2015 | Anderson et al. | |
| 9,342,373 | B2* | 5/2016 | Hansson | G06F 9/5077 |
| 2003/0188155 | A1* | 10/2003 | Petit | H04L 63/0815 713/155 |
| 2005/0138193 | A1* | 6/2005 | Encarnacion | H04L 12/2803 709/230 |
| 2006/0229058 | A1* | 10/2006 | Rosenberg | H04W 4/02 455/404.2 |
| 2008/0063173 | A1* | 3/2008 | Sarkar | H04L 12/1827 379/202.01 |
| 2008/0077665 | A1* | 3/2008 | Sekaran | H04L 12/1827 709/204 |
| 2008/0207215 | A1* | 8/2008 | Chu | H04W 40/26 455/452.2 |
| 2012/0096183 | A1* | 4/2012 | Mercuri | G06F 9/5027 709/241 |
| 2013/0329598 | A1* | 12/2013 | DiFazio | H04W 64/003 370/254 |
| 2015/0074447 | A1* | 3/2015 | Park | G06F 9/45533 714/4.11 |
| 2015/0089399 | A1* | 3/2015 | Megill | H04L 12/1813 715/753 |
| 2015/0163092 | A1* | 6/2015 | Takagi | G06F 9/5077 709/224 |
| 2016/0105473 | A1* | 4/2016 | Klingbeil | H04L 47/2416 370/260 |
| 2016/0105786 | A1* | 4/2016 | Suryavanshi | H04W 4/08 455/434 |
| 2016/0212139 | A1* | 7/2016 | Pike | H04L 63/10 |
| 2017/0091823 | A1* | 3/2017 | Adinarayan | G06Q 30/0269 |
| 2017/0141993 | A1* | 5/2017 | Purushothaman | H04L 43/16 |
| 2017/0220582 | A1* | 8/2017 | McCann | G06F 17/3053 |

OTHER PUBLICATIONS

Extended European Search Report Issed in the European Patent Office in counterpart Eruopean Application No. 16177205.8, dated Jul. 31, 2017, 10 pages.
3GPP TR 23.849 v11.0.0, "3$^{rd}$ Generation Partnership Project; Technical Specification Group Services and System Aspects: Study on Stage 2 aspects of Optimised Service Charging and Allocation of Resources (OSCAR) in the IP Multimedia Subsystem (IMS) whilst roaming (Release 11)", Mar. 2012, *3GPP*, pp. 1-28.

* cited by examiner

METHOD AND SYSTEM FOR OPTIMIZING USAGE OF NETWORK RESOURCES IN A COMMUNICATION NETWORK

FIELD OF THE INVENTION

The present subject matter is related in general to communication network, more particularly, but not exclusively to a method and system for optimizing the usage of network resources in a communication network.

BACKGROUND

With the ever improving technology in the communication front, communication devices like mobile devices are used for performing additional functions such as enabling video calls, playing high definition games, enabling conference calls and so forth in addition to the basic voice calls. Among all the functions provided by the communication devices, conference call has emerged as one of the most important function at the organization level as it bridges the gap between the users. The additional functions provided by the communication devices in-turn require the use of various network resources. Thus, efficient and effective use of the various network resources is required in order to optimize the various additional functions provided by the communication devices.

In one of the existing techniques, for calls involving users across different (access as well as core) networks and involving VoIP network, Next Generation Network (NGN), or IP multimedia subsystem (IMS) network, optimization of network resources for media plane transport may be achieved by optimizing the overall network path between the users involved in the communication session. This is typically achieved by eliminating unnecessary nodes in the network path of the media flow, and by optimizing the transmission length over which the media content is transported between the users. In order to achieve this, the existing technique optimizes the overall network path by selecting appropriate media server for sessions involving media server resources, e.g., conferencing, transcoding, and so forth. However, selection of the appropriate media servers may still result in a sub-optimal utilization of the network resources like bandwidth, Central Processing Unit (CPU), memory and so forth due to a higher network path length arising out of the topology for a particular scenario, policy etc.

In the existing scenario, various techniques have been proposed for selection of appropriate media server for sessions involving media server resources. For example, a technique for selection of appropriate media server is proposed at the point when a media server is required to be brought into the session for the first time for a particular feature (e.g., conference) and may include scenarios involving roaming of the served user. Similarly, another technique for selection of optimal media server for conference calls, takes into account the CPU load (utilization level) of the media processors (the media plane of a media server) that are controlled by a multipoint controller unit (the control plane of a media server) in an operator's network. Further, yet another technique for selection of optimal media server takes into account the calling user's location (which is determined by the prefix or the trunk-group identity, in case of a landline number) and in case of unavailability of calling user's location, the technique takes into account the called user's location. However, the existing techniques for selection of media server are inappropriate for network optimization.

Another problem in the existing technique arises for a multi-party session, where in order to handle a plurality of users say for example, ten users in the session, the selected media server is unable to handle the number of the users individually.

The existing technique thus, fails to address a situation when no media servers can individually fulfil the resource requirements of a session. In addition, the existing technique also fails to address the optimal use of the network resources during the session. Thus, there is a need for a method which provides a federated mode of operation of media servers for establishing a session under resource constraints. Also, there is a need for optimization of the network resources of the media servers in the communication network.

SUMMARY

Disclosed herein is a method and system for establishing a session using a plurality of media server in a communication network. In an embodiment, the method establishes/maintains the session initiated by a user using a plurality of media servers whenever an individual media server cannot handle one or more users. Further, a method and system is disclosed for optimizing the usage of the network resources in the communication network. The usage of the network resources is optimized by a routing server which monitors the session characteristics, user characteristics, media server characteristics and network conditions of an on-going session and identifies disability of at least one media from the plurality of session handling media servers to host one or more users connected to it. The routing server transfers the connectivity of the one or more hosted users to one or more identified alternate media servers which can host the one or more users of the identified at least one media server.

In an embodiment, the present disclosure relates to a method for optimizing the usage of the network resources in the communication network. The method comprises monitoring session characteristics of an on-going session, user characteristics associated with a plurality of users involved in the on-going session, media server characteristics associated with a plurality of media servers and network conditions of the communication network. The on-going session is hosted by a plurality of session handling media servers from the plurality of media servers in the communication network. The method comprises comparing the session characteristics, the user characteristics, the media server characteristics and the network conditions with corresponding set of pre-defined threshold values, identifying at least one media server from the plurality of the session handling media servers that violates the corresponding set of pre-defined threshold values based on the comparison, wherein the at least one identified media server of the plurality of session handling media servers is unable to host one or more users of the plurality of users connected to the identified at least one media server in the on-going session, identifying one or more alternate media servers from the plurality of media servers based on the media server characteristics associated with the plurality of media servers and the network conditions of the communication network and transferring connectivity of the hosted one or more users to the one or more alternate media servers without disconnecting the on-going session to optimize the usage of the network resources.

In an embodiment, the present disclosure relates to a routing server for optimizing the usage of the network resources in the communication network. The routing server comprises a processor and a memory communicatively coupled to the processor, wherein the memory stores processor executable instructions, which, on execution, causes the routing server to monitor session characteristics of an on-going session, user characteristics associated with a plurality of users involved in the on-going session, media server characteristics associated with a plurality of media servers and network conditions of the communication network. The on-going session is hosted by a plurality of session handling media servers from the plurality of media servers in the communication network. The method routing server compares the session characteristics, the user characteristics, the media server characteristics and the network conditions with corresponding set of pre-defined threshold values, identifies at least one media server from the plurality of the session handling media servers that violates the corresponding set of pre-defined threshold values based on the comparison. The at least one identified media server of the plurality of session handling media servers is unable to host one or more users of the plurality of users connected to the identified at least one media server in the on-going session. The routing server identifies one or more alternate media servers from the plurality of media servers based on the media server characteristics associated with the plurality of media servers and the network conditions of the communication network and transfers connectivity of the hosted one or more users to the one or more alternate media servers without disconnecting the on-going session to optimize the usage of the network resources.

In an embodiment, the present disclosure relates to a non-transitory computer readable medium including instructions stored thereon that when processed by at least one processor cause an routing server to monitor session characteristics of an on-going session, user characteristics associated with a plurality of users involved in the on-going session, media server characteristics associated with a plurality of media servers and network conditions of the communication network, wherein on-going session is hosted by a plurality of session handling media servers from the plurality of media servers in the communication network, compare the session characteristics, the user characteristics, the media server characteristics and the network conditions with corresponding set of pre-defined threshold values, identify at least one media server from the plurality of the session handling media servers that violates the corresponding set of pre-defined threshold values based on the comparison, wherein the at least one identified media server of the plurality of session handling media servers is unable to host one or more users of the plurality of users connected to the identified at least one media server in the on-going session, identify one or more alternate media servers from the plurality of media servers based on the media server characteristics associated with the plurality of media servers and the network conditions of the communication network and transfer connectivity of the hosted one or more users to the one or more alternate media servers without disconnecting the on-going session to optimize the usage of the network resources.

In another embodiment, the present disclosure relates to a method for optimizing the network resources using a plurality of media servers in a communication network. The method comprises receiving a request by a user from a plurality of users to initiate a session involving the plurality of users, monitoring media server characteristics associated with the plurality of media servers, user characteristics associated with the plurality of users and network conditions of the communication network, identifying, the plurality of media servers for handling the session involving the plurality of users based on the monitoring. The plurality of media servers individually has insufficient resources to host the session involving the plurality of users. The method comprises connecting one or more users from the plurality of users to the identified plurality of media servers for hosting the session based on the monitoring.

In an embodiment, the present disclosure relates to a routing server for optimizing the network resources using a plurality of media servers in a communication network. The routing server comprises a processor and a memory communicatively coupled to the processor, wherein the memory stores processor executable instructions, which, on execution, causes the routing server to receive a request by a user from a plurality of users to initiate a session involving the plurality of users, monitor media server characteristics associated with the plurality of media servers, user characteristics associated with the plurality of users and network conditions of the communication network, identify the plurality of media servers for handling the session involving the plurality of users based on the monitoring. The plurality of media servers individually has insufficient resources to host the session involving the plurality of users. The routing server connects one or more users from the plurality of users to the identified plurality of media servers for hosting the session based on the monitoring.

In an embodiment, the present disclosure relates to a non-transitory computer readable medium including instructions stored thereon that when processed by at least one processor cause an routing server to receive a request by a user from a plurality of users to initiate a session involving the plurality of users, monitor media server characteristics associated with the plurality of media servers, user characteristics associated with the plurality of users and network conditions of the communication network, identify the plurality of media servers for handling the session involving the plurality of users based on the monitoring, wherein the plurality of media servers individually has insufficient resources to host the session involving the plurality of users and connects one or more users from the plurality of users to the identified plurality of media servers for hosting the session based on the monitoring.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
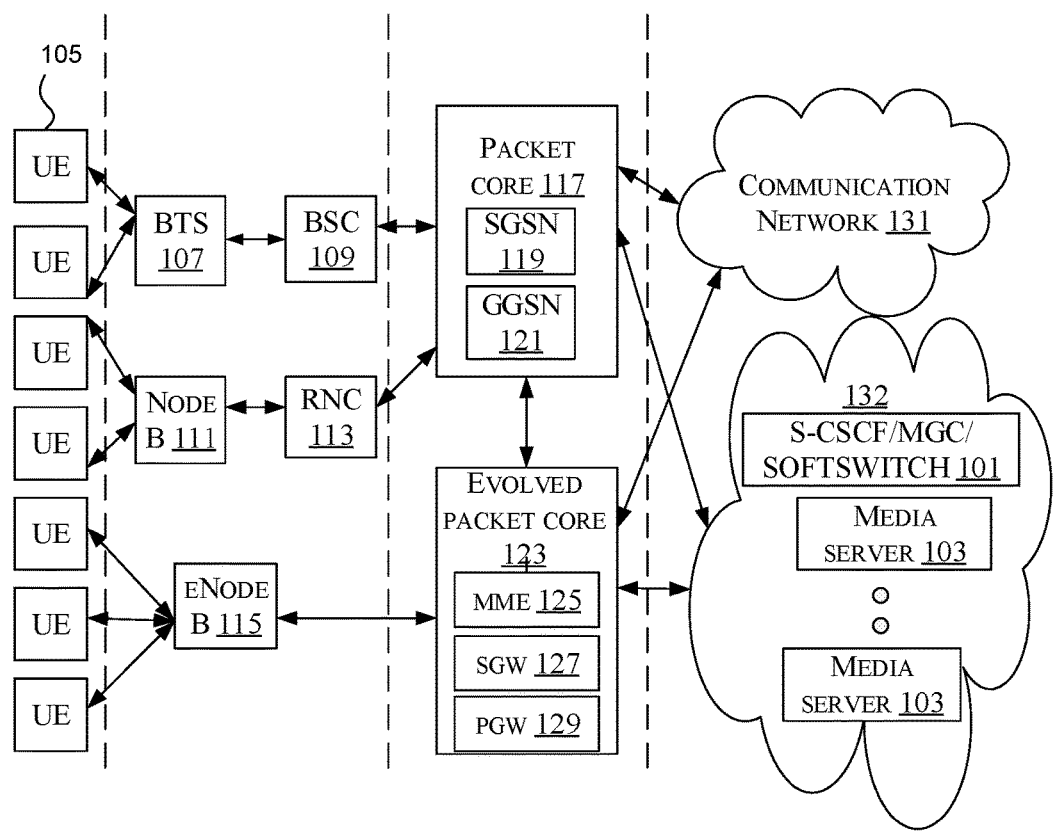
FIG. 1 illustrates an exemplary environment illustrating communication network architecture in accordance with some embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method for optimizing the network resources using a plurality of media servers in a communication network. In an embodiment, a session is initiated by a user from a plurality of users using a plurality of media servers in the case where a single media server cannot host one or more users in the initiated session due to resource constraints. In an embodiment, the resource constraints identification is performed. The one or more users of the media server having resource constraints are transferred to one or more alternate media servers (newly chosen) based on the done based on a monitoring of the session related characteristics, user characteristics, media characteristics and network conditions. In such cases, the plurality of media servers work together by sharing one or more session related information to handle the initiated session efficiently. The session is handled efficiently by connecting one or more users to the identified plurality of media servers for hosting the session. The present disclosure also relates to a method and system for optimizing the usage of the network resources in the communication network. In an embodiment, the network resources comprise plurality of media servers utilized in the communication network, resources utilized in the processing and/or transmission of user data (e.g., voice packets, video streaming, text, etc.) in the network. The present disclosure provides a routing server which optimizes the usage of the network resources in the circumstances where at least one media server which handles the on-going session is unable to host one or more users from the plurality of users due to the system resource constraints. Further, the at least one media server is identified from the on-going session based on a comparison of session characteristics, user characteristics of the plurality of users involved in the session, media server characteristics of the plurality of media servers and network conditions of the communication network with the corresponding pre-defined threshold values. On identification of at least one media server, one or more alternate media servers from the plurality of the media servers present in the communication network are identified. The one or more alternate media servers are identified based on the monitoring of session characteristics, users characteristics of the plurality of users involved in an on-going session, media server characteristics of the plurality of media servers and network condition. In an embodiment, the identified one or more alternate media servers satisfy a pre-defined network path length and an optimal usage of network resources in the communication network. In such a way, the usage of the network resources is optimized without disconnecting the on-going session.

FIG. 1 illustrates an exemplary environment illustrating communication network architecture in accordance with some embodiment of the present disclosure.

As shown in FIG. 1, the environment 100 comprises a communication network architecture which includes one or more user equipment (UE) 105 communicating wirelessly with various radio access networks. The UE 105 may include, but are not limited to, a cell phone, a smart phone, a tablet, a phablet, laptop etc. The radio access networks include, but are not limited to, a GSM EDGE Radio Access Network (GERAN), a Universal Mobile Telecommunication System UMTS terrestrial radio access network (UTRAN), and an evolved UMTS terrestrial radio access network (E-UTRAN). A base transceiver station (BTS) 107 and a base station controller (BSC) 109 form the GERAN while a Node B 111 and a radio network controller (RNC) 113 form the UTRAN. Similarly, evolved Node B (eNode B) 115 form the E-UTRAN and acts as the base station for E-UTRAN i.e., LTE network. However, the depicted radio access networks are exemplary and it will be understood that the teachings of the disclosure contemplate other wired and wireless radio access networks such as worldwide interoperability for microwave access (WiMAX) network, code division multiple access (CDMA) network, High Speed Packet Access (3GPP's HSPA) network, Wireless Local Area Network (WLAN) network and so forth. Each of the radio access networks may communicate with a respective packet core which in turn may communicate with external packet switched networks. For example, in the illustrated embodiment, the GERAN and the UTRAN communicate with a packet core 117 that comprises serving GPRS Support Node (SGSN) 119 and gateway GPRS Support Node (GGSN) 121. As will be appreciated by those skilled in the art, General Packet Radio Service (GPRS) is a packet-oriented mobile data service that enables 2G and 3G cellular networks to transmit IP packets to external networks such as the Internet. The SGSN 119 is a component of the GPRS network that handles functions related to packet switched data within the network such as packet routing and transfer, mobility management, charging data, authentication of the users, and so forth. Similarly, GGSN 121 is another component of the GPRS network and is responsible for the interworking between the GPRS network and external packet switched networks, such as Internet 131. Similarly, E-UTRAN communicates with an evolved packet core (EPC) 123 that comprises a Mobility Management Entity (MME) 125, a Serving Gateway (SGW) 127, and a Packet data Network Gateway (PGW) 129. The MME 125 may be responsible for Evolved Packet System (EPS), Session Management (ESM), EPS mobility management (EMM), EPS Connection Management (ECM), ciphering and integrity Protection, inter core network signaling, System Architecture Evolution (SAE) bearer control, handover, and so forth. The combined functionalities of the SGW 127 and the PGW 129 may include lawful interception (LI), packet routing and forwarding, transport level packet marking in the uplink and the downlink, packet filtering, mobile IP, policy enforcement, and so forth. The PGW 129 further connects the EPC 123 with external packet switched networks such as the communication network 131, communication network 132. In an embodiment, the communication network 131 may comprise an Internet and any other packet switched networks. Examples of the packet switched networks may include, but are not limited to, a Voice over IP (VoIP) network, a Next Generation Network (NGN), an IP Multimedia Subsystem (IMS) network etc. Each of the packet switched networks such as communication network 132 may include a node 101 that anchors the session and is responsible for session management, routing and control. The node 101 may be a Media Gateway Controller (MGC) in case of the NGN, a softswitch in case of the VoIP network, or a Serving-Call Session Control Function (S-CSCF) in case of the IMS networks. The S-CSCF/MGC/Softswitch is herein after referred as routing server 101 Additionally, the routing server 101 may be responsible for control and management of plurality of media servers 103. The plurality of media servers 103 processes the audio or video streams associated with a communication session. It will be further apparent to a person skilled in the art that for a communication network other than those illustrated, network components and parameters associated with that communication network will be used.

Figure 2A:
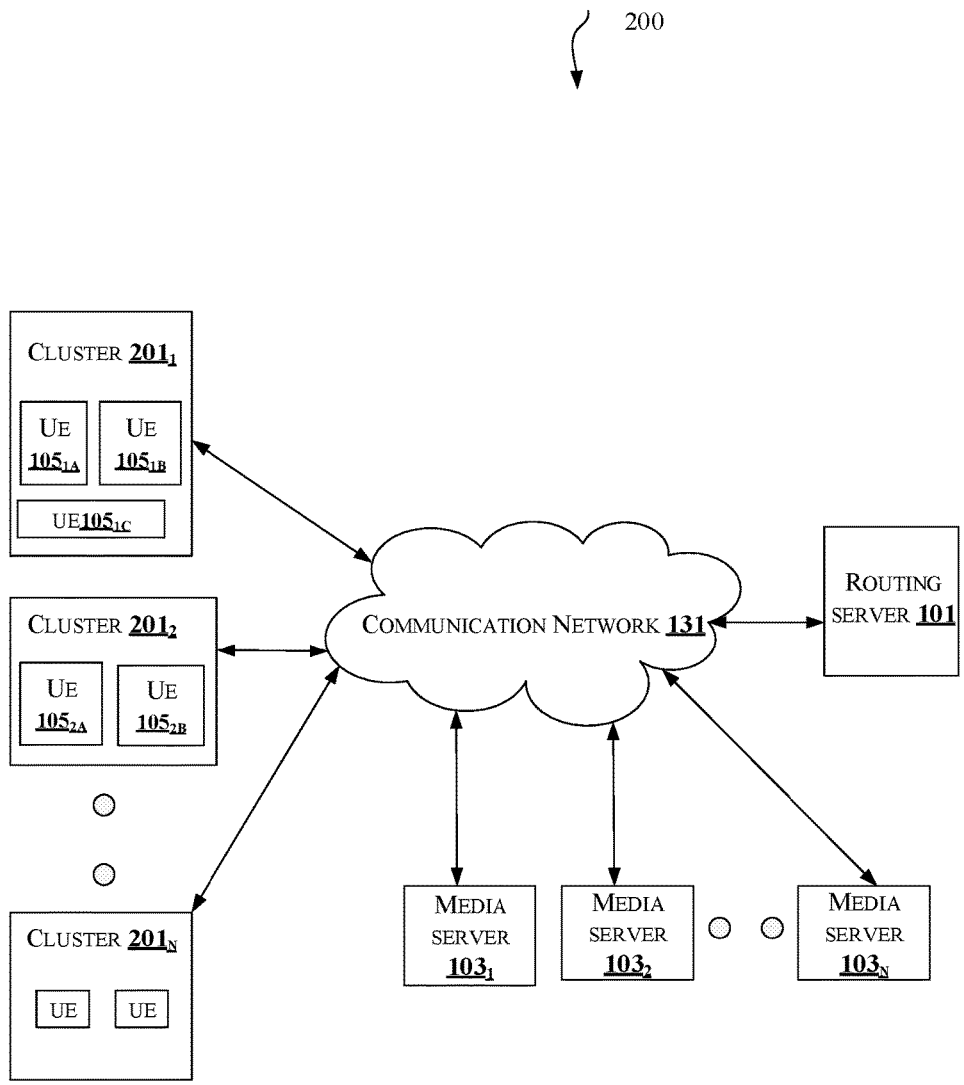
FIG. 2A shows an exemplary environment for optimizing the usage of the network resources in accordance with some embodiments of the present disclosure.

FIG. 2A shows an exemplary environment for optimizing the usage of the network resources in accordance with some embodiments of the present disclosure.

Figure 2B:
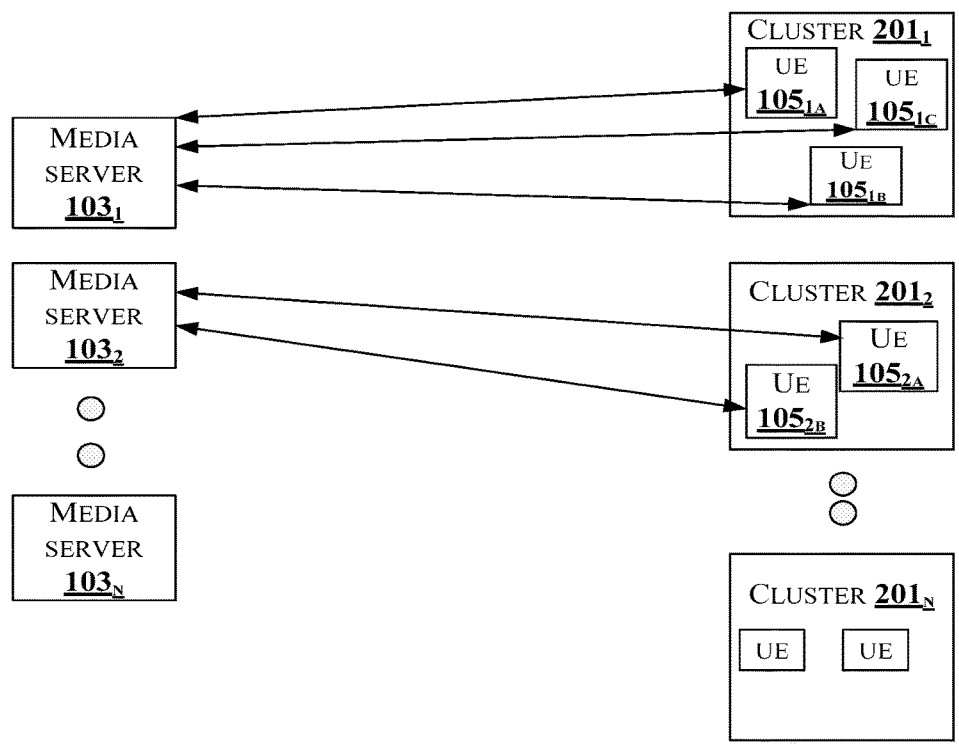
FIG. 2B shows an exemplary representation of media servers and clusters in accordance with some embodiment of the present disclosure.

As shown in FIG. 2A, the environment comprises a routing server 101, a media server $103_1$, a media server $103_2$, . . . , a media server $103_n$ (collectively referred as plurality of media servers 103) and a cluster of users $201_1$, a cluster $201_2$, . . . , a cluster $201_n$ (collectively referred as clusters 201) interconnected through a wired or wireless communication network 131. In an embodiment, the number of clusters 201 may vary based on the identification of the appropriate number of clusters 201 of users. The routing server 101 is the device in the network, connecting a session, which may be an audio session or a video session across different locations of the users. A session is initially set-up between a plurality of users from different/same clusters. In an embodiment, the session is initiated by a user from the plurality of users for establishing a connection with other users. The session may involve plurality of media servers in the case where one of the media server from the plurality of media servers 103 cannot host all users connected to the on-going session. The routing server 101 further monitors the initiated session characteristics, user characteristics associated with the plurality of users in the on-going session, media server characteristics of the plurality of media servers 103 and network conditions of the communication network 131. The on-going session is hosted by a plurality of session handling media servers from the plurality of media servers 103. The session handling media servers are the media servers which handle an on-going session in the network. As shown in FIG. 2B, the session handling media servers are media server $103_1$ and media server $103_2$. In an embodiment, the session characteristics of the on-going session comprises information about session setup procedures, one or more policies associated with the on-going session and type of the on-going session initiated, where the type includes information about the codec used, audio or video call, bandwidth required for the session and the type of the media flow from the network. Further, the user characteristics comprises the number of the plurality of users in the on-going session, current location of the plurality of users, mobility of the plurality of users, speed and direction of movement of the plurality of users, policies related to the plurality of users, number of users entering the on-going session, and the number of users exiting the on-going session. Further, the media server characteristics comprises the number of the plurality of session handling media servers used in the on-going session, information pertaining to system resources present in the plurality of media servers, number of users handled by the plurality of session handling media servers, the number of the plurality of media servers, information pertaining to occupancy levels of resources on each of the plurality of media servers, inter media server distance, and information associated with the plurality of users handled by the plurality of session media servers. In an embodiment, the network conditions comprise policies corresponding to selection of the plurality of session handling media servers and a congestion level of different network segments in the communication network. Further, the routing server 101 compares the session characteristics, user characteristics, media server characteristics and the network conditions with the corresponding set of threshold values. In an embodiment, the set of threshold values are pre-defined by the routing server 101. The set of threshold values are explained in detail in FIG. 3. Further, based on the comparison, the routing server 101 identifies at least one media server from the plurality of session handling media servers which violates the set of threshold values and is unable to host one or more users of the plurality of users of one or more clusters of users 105. FIG. 2B shows an exemplary representation of media servers and clusters in accordance with some embodiment of the present disclosure. As shown in FIG. 2b, the media server $103_1$ is connected to the first cluster $201_1$ and handles UE $105_{1A}$, UE $105_{1B}$ and UE $105_{1C}$ of the cluster $201_1$. Also, the media server $103_2$ is connected to the second cluster $201_2$ and handles UE $105_{2A}$ and UE $105_{2B}$ of the cluster $201_2$. The media server $103_1$ handles all the user equipment (UE) 105 of the cluster $201_1$ However, based on the comparison, the routing server 101 identifies the insufficiency of the media server $103_1$ in hosting one of the UE 105 i.e., UE $105_{1B}$ of the first cluster $201_1$. The routing server 101 further identifies one or more alternate media servers from the plurality of media servers 103 which can host the one or more users of the identified media server. This is shown in FIG. 2C, where FIG. 2C shows an exemplary representation of transferring the connectivity of one or more users of a media server to alternate media server in accordance with some embodiment of the present disclosure.

Figure 2C:
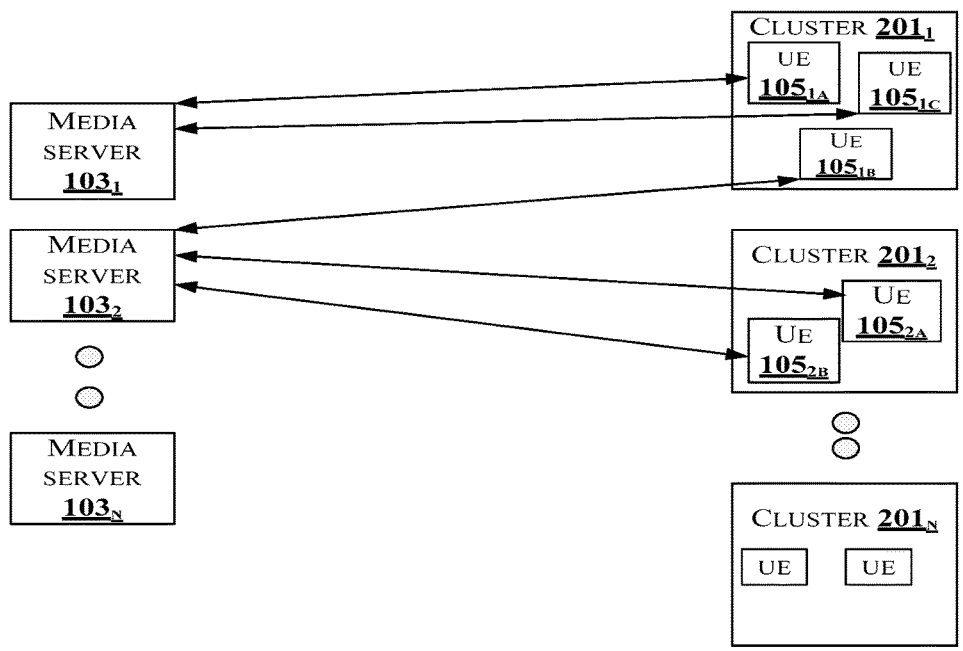
FIG. 2C shows an exemplary representation of transferring the connectivity of one or more users of a media server to alternate media server in accordance with some embodiment of the present disclosure.

As shown in FIG. 2C, the media server $103_2$ is identified by the routing server 101 based on the monitoring, which can host the identified UE $105_{1B}$ of the first cluster $201_1$. Thus, the routing server 101 transfers the connectivity of the identified UE $105_{1B}$ of the first cluster $201_1$, hosted by the media server $103_1$ to the alternate media server, which is media sever $103_2$ without disconnecting the on-going session. As shown in FIG. 2C, the routing server 101 transfers the connectivity of one UE $105_{1B}$ of the cluster $201_1$ from media server $103_1$, which is the identified media server, to the media server $103_2$, which is the alternate media server to host the user equipment of the first cluster $20104_1$ Thus, the UE $105_{1A}$ and $105_{1C}$ are hosted by the media server $103_1$ and UE $105_{1B}$, UE $105_{2A}$ and UE $105_{2B}$ are hosted by the media server $103_2$ upon monitoring as shown in FIG. 2C.

Figure 3:
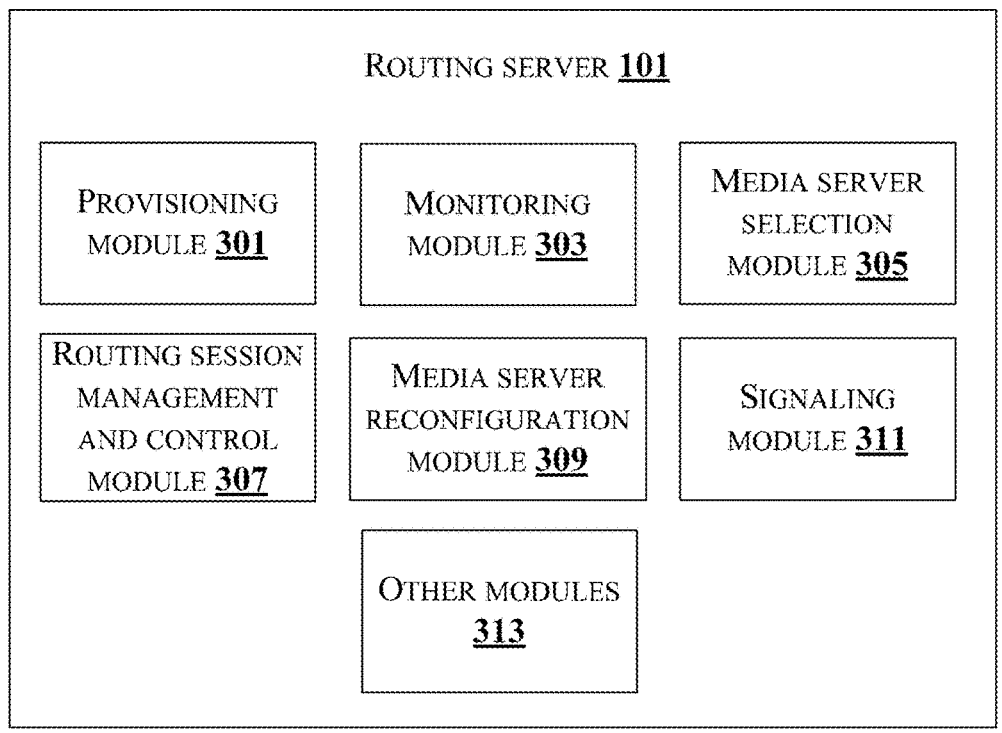
FIG. 3 shows a block diagram of a routing server in the communication network in accordance with some embodiment of the present disclosure.

FIG. 3 shows a block diagram of a routing server in the communication network in accordance with some embodiment of the present disclosure.

As shown in FIG. 3, the routing server comprises, a Provisioning Module (PM) 301, a Monitoring Module (MM) 303, a Media Server Selection Module (MSSM) 305, a Routing Session Management and Control Module (RSMCM) 307, a Media Server Reconfiguration Module (MSRM) 309, a Signaling Module (SM) 311 and other modules 313.

The PM 301 is typically responsible for obtaining the provisioned inputs from the communication network and passing them to the relevant modules of the routing server 101. The provisioned inputs may include inputs for session management and control, list of interfacing signaling nodes (e.g., another softswitch/MGC in case of VoIP or NGN, or -CSCF (I-CSCF), proxy-CSCF (P-CSCF), Home Subscriber Server (HSS), etc. in case of IMS), and so forth. Further, the PM 301 obtains provisioned inputs of the network topology, including the location of the plurality of media servers in the communication network. The PM 301 passes this input to the MSSM 305. The PM 301 further obtains provisioned inputs of the policies related to session routing and media server selection (e.g., a call involving a LI target user must be routed via the home network of the LI target user, and a media server present in the LI target's home network must be selected). The PM 301 passes this input to the RSMCM 307 and to the MSSM 303. The PM 301 further obtains provisioned inputs about inter-operator agreements regarding usage of media server resources, in case of calls involving roaming, and in case of users involved in the session being present in different networks. The PM 301 passes this input to the MSSM 305. The PM 301 further obtains provisioned inputs about the thresholds for factors that must trigger a (re)selection of the media server (for e.g., load level of system resources of the media server, congestion level in the network segment of the media server, change in overall network path length), and threshold limits based on which a media server re-selection is not to be performed (for e.g., the last media server (re)selection took place <'x' minutes ago, <'y' minutes are remaining for a scheduled conference call). The PM 301 passes this input to the MM 303 and to the MSSM 305. In addition to these, the PM 301 obtains the mandatory media server (MMS) list provided per network segment for the regulatory policy such as LI, home-network segment routing, cluster distance multiplication factor (DIST_MF) which is used for reducing the number of clusters to a value lower than or equal to MAX_CLUS_THRESH. Further, the PM 301 obtains a plurality of threshold values, like MAX_CLUS_THRESH, ONPL_THRESH, HO_THRESHOLD, BUFF_SM_MIN_THRESH, MINSESS_THRESHOLD, NTWCONG_THREHSOLD and SYS_THRESHOLD. The MAX_CLUS_THRESH is the threshold for maximum number of clusters which influences the number of media servers used in the session. The ONPL_THRESH is the threshold for the overall network path length, the HO_THRESHOLD defines the threshold for the number of users to be handed over for playing comfort noise, announcement etc. The BUFF_SM_THRESH is the threshold value for determining the requirement of any buffering due to the high inter-cluster distance. The MINSESS_THRESHOLD defines the minimum number of user to be handled by a media server using media server selection. The NTWCONG_THRESHOLD defines the network congestion threshold for the network segment of each media server and the SYS_THRESHOLD defines the system resources thresholds for each of the media servers.

The MM 303 performs functions related to measurements and monitoring of various resources and network conditions. Additionally, the MM 303 informs the media servers, via the SM 311, of the system resources load and network congestion threshold limits upon crossing which the media servers notifies the MM 303 regularly. The MM 303 further receives notification from the media servers, via the SM 311, regularly once the thresholds are crossed, until the situation returns to normal (i.e., the values become lower than the thresholds). The MM 303 further passes the relevant information to the MSSM 305 upon receiving such notifications from the media servers. Further, the MM 303 collects information from relevant modules about the congestion level in the overall network and Current Attempts Per Second (CAPS) being handled by the RSMCM 307. Based on factors such as overall network congestion, current CAPS handled by the RSMCM 307, load levels of all media servers, and so forth, the MM 303 dynamically adjusts relevant thresholds of network conditions that must trigger a (re)selection of the media server (e.g., threshold for the load level of the media server, congestion level in the network segment of the media server). After adjusting the thresholds, the MM 303 determines whether the MSSM 305 is to be triggered for media server selection. It should be noted that the threshold adjustment and determination may be performed upon receiving a notification from one or more media servers, or may be performed periodically. In addition to the above function, the MM 303 initiates proactive handover of one or more users to prevent adverse effect to an on-going session. The MM 303 periodically checks values of MMPARAMS and compares them against the MSSPARAMS_TH. The MMPARAMS are the parameters monitored by the MM 301 and the MSSPARAMS_TH are the corresponding threshold values of these parameters, the MMPARAMS comprises system resource usage level, network segment congestion level etc. Further, upon receiving a report of the RMMPARAMS information from all the available media servers, the MM 303 triggers the MSSM 305 whenever the RMMPARAMS of one or more media servers have crossed the RMMPARAMS_TH. Further, the MM 303 checks if difference of the value of any parameter in the RMMPARAMS of a media server (eg. MS_1) and the corresponding RMMPARAMS_TH is less than the ADAPT_ THRESH. Also, if the difference of the value of the same parameter and the corresponding RMMPARAMS_ TH in at least two other media server is greater than a pre-defined percentage of the corresponding RMMPARAMS_TH, then the resources and traffic of one users of the session is computed. Further, if the handover of one or more users results in RMMPARAMS of the media server (MS_1) being greater than the pre-defined percentage (eg. 1.5x %), then the MM 303 triggers the MSSM 305 with an indication that one or more users needs to be proactively handover from media server (MS_1) to an appropriate media server. In an embodiment, the ADAPT_THRESH is defined as the product of provisional threshold value THRESH and alpha_1, where the alpha_1 defined as follows:

Alpha_1=1, if a proactive handover was >90% of the successful and effective based on the data obtained from the MSSM 305 (effective refers to a session which continued stably at least for another 'x' seconds without handover of the same user due to resource constraint/network conditions)

Alpha_1=1.2, if proactive handover was >75%, <=90%,

Alpha_1=1.4, if proactive handover was >50%, <=75% and

Alpha_1=2, otherwise.

The MSSM 305 performs functions related to media server selection. In accordance with aspects of the present disclosure, the MSSM 305 determines whether a media server has to be selected for one or more ongoing user sessions, based on factors such as mobility of one or more users involved in the session, change in session characteristics (e.g., a new codec introduced), congestion-levels in the network segment in which the media server is present or if system resources of the media server (CPU utilization as well as other resources) are affected, congestion level in the overall network, when did the last media server selection happen for the session, time remaining for the session in case of a scheduled conference, and so forth. The MSSM 305 further assigns the one or more users to another cluster which has the least Inter-Cluster Distance (ICD) from the cluster in which the one or more users were initially present. Further, the MSSM 305 checks if the media server of another cluster to which one or more users are assigned has sufficient resources to host additional users. The MSSM 305 stores the information of the new media server which is going to host the one or more users, or assigns the one or more user to the clusters 201 which has the next least ICD from the cluster of that user. This process continues until a successful allocation of cluster of users or if there are no more clusters 201. Based on the checking, the MSSM 305 further determines if there are any changes in the assignment of even one user from the one or more users. Further, the MSSM 305 refines the list of available media servers received from the RSMCM 307 for creating a list of selectable media servers for the on-going session based on the regulatory or network policy. In addition to this, the MSSM 305 also determines the subset of the Mandatory Media Servers (MMS) to be selected for the session. Further, for each of the media servers in the list of the available media servers, the MSSM 305 checks the following condition:

system_resources_used+system_resources_needed for
   MINESS_THRESHOLD
   users>SYS_THRESHOLD in RMMPARAMS_
   TH OR;

Network congestion level+increase in congestion
   level due to expected traffic from
   MINSESS_THRESHOLD
   users>NTWCONG_THRESHOLD in
   RMMPARAMS_TH;

Further, if the condition is satisfied, then the corresponding media server is removed from the list of the available media servers. The MSSM 305 also forms clusters of users involved in the session. In an embodiment, user 1 is assumed to be the user initiating the session and there are 'n' users in the session. Further, the MSSM 305 forms a list of the users in the session with users location information and the distance of each users from every other users in the session. Further, the MSSM 305 initializes cluster id for all the 'n' users to zero and assigns the cluster id for user 1 equal to one. In an embodiment, for each of user k, where 1<k<n, the MSSM 305 computes distance of users k, for each cluster 'm' that has already been allocated, from the user already present in the cluster 'm'. In case, where there is only one user in cluster 'm'. The MSSM 305 also computes the distance from the cluster center, if the cluster center is already present for cluster 'm'. Further, the MSSM 305 checks if the distance computed for each user k is less than DIST_THRESH for each cluster 'm' which has been allocated. Further, the MSSM 305 checks the following conditions:

User $k$'s distance<DIST_THRESH for cluster '$m$'

If the condition is true, the MSSM 305 marks cluster 'm' as suitable cluster (SCLUS). Further, after checking the distance of user k for all the clusters, if there are no clusters whose distance from user k is less than the DIST_THRESH, then the MSSM 305 allocates a new cluster id to a user k and performs the selection of appropriate media server for the next user. Further, among the clusters in SCLUS, the MSSM 305 assigns cluster id of user k, to the cluster having the least distance from user k. In case of a tie, if the media server selection is for an on-going session and if one of the tied entries was the cluster id of user k, then the MSSM 305 retains the same cluster id for user k and also computes the cluster center location for the cluster assigned to user k. Further, the ability to handle all the users in the cluster is determined by performing the comparison as follows:

Current resource usage_level in the media server+
   estimated_resources needed for handling the
   users<SYS_THRESHOLD value in the
   RMMPARAMS_TH; and Current congestion_level in the network segment of
the media server+estimated_traffic for handling
all users<the NTWCONG_THRESHOLD value
in RMMPARAMS_TH.

Where, the estimated resources needed for handling all the users is the product of estimated resources for handling one user and the number of users in the cluster and the estimated resource for handling one user depends on the session characteristics. Based on this, the MSSM 305 indicates that all the users can be handled. In an embodiment, when the comparison is same, and the selection is for an on-going session, then the MSSM 305 selects a media server which is already assigned for the session, or a media server that can cater to a higher number of users in that cluster. Further, in the case where there are no media servers which can handle all the users in a cluster individually, than the MSSM 305 selects two media servers, one with the least SUIT_LEVEL and the one with the next least SUIT_LEVEL. The MSSM 305 further splits the users in the clusters among the two media servers by determining the nearest media severs for the users, and also ensuring that the limit of number of users that a media server can handle is not exceeded.

The MSSM 305 selects the one or more alternate media servers based on the inputs received from the RSMCM 307, where the input is the list of the available media server prepared based on the heartbeat response from the plurality of media servers 103 and the information about all the RSMCMPARAMS and the inputs from MM 303, which comprises values of RMSPARAMS from the available media servers. The MSSM 305 checks if the media server handling the new cluster has sufficient resources to host additional users. The MSSM 305 then instructs the media server re-configuration subsystem MSRM 309 to perform the necessary actions to ensure a seamless handover of the session from one media server to one or more alternate media servers 103.

The RSMCS 307 performs routing, session management and control functions. Such functions may include setting up and tear down of the session, routing a session initiation request after suitable processing to the correct node (e.g., to a Breakout Gateway Control Functions (BGCF) for a call from an IMS calling user towards a Public Land Mobile Network (PLMN) or Public Switched Telephone Network (PSTN) called user), triggering charging functions, checking policies, performing appropriate actions upon invocation of features (e.g., call forwarding, call completion to busy subscriber), passing relevant information to the billing subsystem, and so forth. In addition to these, the RSMCM 307 monitors the following user characteristics of the plurality of users involved in the session, which are collectively referred as RSMCM 307 parameters. The RSMCM 307 parameters comprises initiation and termination of the mobility of one or more users involved in the session, change in speed of the one or more users, addition of one or more new users to the session, one or more users exiting the session, change in the one or more policies associated with the one or more users for example, activation of LI for one or more users in between the on-going session and change in the media characteristics of the session, for example, the major content flow from one of the users in the session as in the case of streaming session and download. Further, any changes in the codec used in the session which requires a different amount of media processing resources etc. In addition, the RSMCM 307 sets up the session with the chosen plurality of media servers, addresses potential quality issue in the session, performs action for transferring one or more users and assess the effectiveness of the one or more adaptations during the on-going session. The RSMCM 307 triggers the MSSM 305 for selecting an appropriate media server by indicating that the selection is for a new session/on-going session. The RSMCM 307 also triggers MM 303 for monitoring the session. Further, in order to perform the handover from the present media server to one or more alternate media servers, the RSMCM 307 triggers the MSRM 309 to determine if all the existing packets in the present media server is to be sent to the user/from the user to plurality of users before sending new packets from the newly chosen media servers (NCMS). The RSMCM further determines if one or more media servers currently used in the session are no longer involved, by comparing the list of the newly chosen media servers provided by the MSSM 305 and the media servers currently used. Based on this comparison, the RSMCM 307 checks if handover of users of one or more media servers have to be handed over, then, the RSMCM 307 also checks if handover of users of more than one media server is required. Based on the checking, the RSMCM 307 performs the handover in parallel, if sufficient resources exist in the new media servers. Further, the RSMCM 307 assesses the effectiveness of the changes and adaptations carried for handover function by requesting feedback from each of the impacted media servers via the MM 301. In an embodiment, if the change was due to the network conditions (for example, resource usage, congestion etc.), then the RSMCM 307 checks the following conditions:

change did not result in >10% improvement in the
network conditions, then

Re-assess the situation after sometime, for example say 3 minutes, and if still improvements is <10%, then a re-execution of selection of appropriate media servers is carried out.

Alternatively, the RSMCM 307 checks for any issues in the users handover, quality of experience, crossing thresholds etc. and if any of the issues persists, then a re-execution of selection of appropriate media servers is carried out again.

The MSRM 309 is responsible for ensuring a seamless handover of the media server after a media server re-selection happens. Upon receiving trigger from the MSSM 305 to perform a media server handover, the MSRM 309 requests and receives relevant information from the RSMCM 307 and the MM 303, and determines the steps involved in the handover process, taking into consideration factors such as session characteristics (e.g., voice session, data session), locations and distance between the presently used media server and newly selected media server, and so forth. The MSRM 309 then instructs the RSMCM 307 to appropriately reconfigure the session, and also sends relevant instructions, via the SM 311, to the presently used media server and the one or more newly chosen media servers. Upon completion of the re-configuration actions, the MSRM 309 informs the MSSM 305. Further, the MSRM 309 evaluates to assess the need for addressing quality experience of the plurality of users in the on-going session based on the inputs and triggers from the RSMCM 307. In an embodiment, the MSRM 309 compares and checks if the number of users handed over from the plurality of users is greater than the HO_THRESHOLD value, then depending on the network policy, the quality experience of the plurality of users is addressed by playing comfort noise, re-playing of last few packets, announcements till the handover is complete. Further, for each of the cluster pair the MSRM 309 obtains information about the congestion level (CONG_LEVEL) of the plurality of media server 103 from the MM 303 and computes if any buffering needs to be performed based on the following equation:

$$BUFF\_SM = ICD * CONG\_LEVEL$$

Where, CONG_LEVEL_AVG=Average of the congestion level of the MS handling the cluster. Further, the MSRM 309 adapts BUFF_MIN_THRESH to obtain BUFF_SM_MIN_THRESH_PRIME as follows:

$$BUFF\_SM\_MIN\_THRESH\_PRIME = BUFF\_SM\_MIN\_THRESH * GAMMA$$

Where, gamma=1.0, if jitter is within 2 seconds on average; 1.2, if jitter is between 2-5 seconds on average and 1.4 otherwise.

Jitter=average value of jitter stored in MSSM 305 and provided to MSRM 309.

Initial value of BUFF_SM_MIN_THRESH_PRIME=BUFF_SM_MIN_THRESH, when jitter data exists. Further, the MSRM 309 checks if BUFF_SM is greater than the BUFF_SM_MIN_THRESH_PRIME for a cluster pair, then the MSRM 309 determines the time to buffer, which is obtained from the pre-provisioned duration based on the range within which the BUFF_SM falls under. For example, one second if 20<=BUFF_SM<40, 2 seconds if 40<=BUFF_SM<60).

The SM 311 performs sending/receiving signaling messages to/from other nodes in the network, thereby acting as the signaling interface. Such nodes may include HSS, I-CSCF, P-CSCF, BGCF, media servers, application servers, etc. in case of an IMS network, or another softswitch/MGC, media gateway (MGW), application servers, etc. in case of a VoIP/NGN network. In addition, the SM 311 receives the threshold values of congestion level and utilization of system resources of the media server (CPU as well as other resources) from the MM 303, and conveys the received information to the different media servers. Upon receiving a notification from a media server containing info about crossing of threshold values, the SM 311 passes the information to the MM 303. Additionally, upon receiving instruction about the media server handover actions, the SM 311 passes relevant instructions to the present and the one or more newly chosen media servers from the plurality of media servers 103. Further, the SM 311 also passes the information such as time to buffer network traffic from/to one or more users from the MSRM 309 to plurality of media servers.

In an embodiment, the other modules 313 may be responsible for functions such as billing, configuration, maintenance etc.

Figure 4:
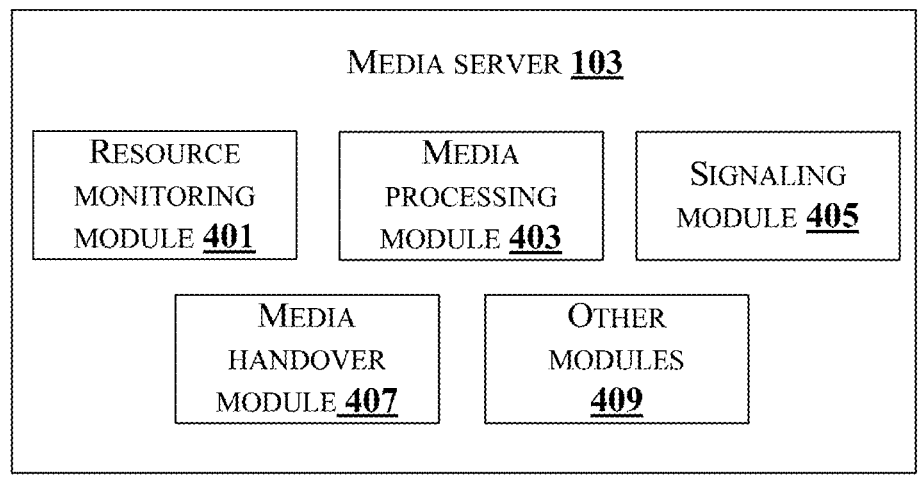
FIG. 4 shows a block diagram of an exemplary media server in accordance with some embodiments of the present disclosure.

FIG. 4 shows a block diagram of an exemplary media server in accordance with some embodiments of the present disclosure.

As shown in FIG. 4, the media server comprises a resource monitoring module (RMM) 401, a media processing module (MPM) 403, a signaling module (SM) 405, a media handover module (MHM) 407 and other modules 409.

The RMM 401 performs functions such as monitoring of the resources in the plurality of media server, helping to decide whether media processing can be done for a session as requested by routing server 101. In addition, the RMM 401 monitors one or more parameters which are collectively known as RMM parameters (RMMPARAMS). The RMM 401 periodically compares the RMMPARAMS with the corresponding pre-defined threshold values (referred as RMMPARAMS_TH) received from the routing server 101 via SM 405. The RMMPARAMS comprises system resource usage (CPU, memory, ports, receive queue occupancy level etc), network segment congestion level, data packet delays etc. The RMM 401 further monitors the utilization of system resources in the plurality of media server, and the network congestion level in the network segment in which the media server is present. Further, the RMM 401 compares the monitored resources with the corresponding threshold values.

The MPM 403 performs media processing functions such as transcoding, creating multiple copies of media contents, distributing media contents to all the users involved in a session, performing media content duplication for lawful interception (LI), and so forth. In addition to its existing functions, the MPM 403 delays sending of certain media packets to the users involved in the session, and/or forward last few media packets to the newly selected one or more alternate media servers based on instructions received from the MHM 407. In addition, the MPM 403 also monitors jitters observed in the on-going session and performs buffering, insertion of comfort noise, playing of announcements based on the instructions received from the MSRM 309 in the routing server 101.

The SM 405 is the signaling interface to other nodes in the network (e.g., to the routing server 101, and to the Media Resource Broker MRB if an MRB is present). In addition to its existing functions, the SM 405 receives pre-defined thresholds from the routing server 101 for utilization of system resources in the plurality of media server, and the network congestion level in the network segment in which the plurality of media servers are present. The SM 405 passes this information to the RMM 401. Further, the SM 405 receives notification from the RMM 401 upon crossing of pre-defined thresholds, and passes this notification to the routing server 101. Further, the SM 405 receives instructions from the routing server 101 regarding actions to be performed during the handover of the media server to one or more alternate media servers, and pass the instructions to the MHM 407. In addition, the SM 405 passes the instructions received from the MSRM 309 in the routing server 101 to the MPM 403.

The MHM 407 is responsible for seamless handover from an existing media server to one or more alternate media servers after a media server re-selection occurs. The MHM 407 in the existing media server receives instructions from the routing server 101 for the actions to be performed during the media server handover to one or more alternate media servers. For example, MHM 407 ensures all available media packets are successfully sent and acknowledged, drops any pending media packets, and so forth. The MHM 407 translates these instructions into actions and instructs the MPM 403 accordingly. The MHM 407 in the exiting media servers further sends a notification to the routing server 101 upon successful completion of requested actions. Similarly, the MHM 407 in the one or more alternate media servers receives instructions from the routing servers for the actions to be performed during the media server handover from the existing media server. In addition, the MHM 407 performs the action to ensure smooth handover of one or more users to/from one or more alternate media servers. In an embodiment, if one or more users are required to be handled by a media server different form the one handling them currently, then a handover of the user traffic from the present media server to the newly chosen media server is performed. Further, based on the processing of the RSMCM 307 and the MSRM 309 for the handover function, the signaling module 311 of the routing server 101 receives instructions to handover a user to NCMS along with the NCMS identity. In addition, this information is passed to the MHM 407 of the present media server. Based on these instructions received, the MHM 307 checks if any remaining media packets to/from one or more users may be dropped, without forwarding to the one or more users (for example, in case of a voice call). Further, the MHM 407 instructs the MPM 403 to drop the remaining packets and send notification to the routing server 101. Further, the MHM 407 checks if the remaining media packets to/from one or more users have to be forwarded to the NCMS and instructs the MPM 403 to forward them to the MPM 403 of the NCMS. Further, upon completion of sending and receiving acknowledgment, if applicable, the MHM 407 sends an indication of the completion to the routing server 101 and to the NCMS. Further, the MHM 407 in the NCMS checks if any new media packets can be sent immediately based on the instructions received from the routing server 101 and instructs the MPM 403 to start sending the new media packets. Further, the MHM 407 checks if the media packets received from the MPM 403 is to be forwarded to the plurality of users before starting to send the new media packets and instruct the MPM 403 to do so, until 407 the MPM 403 receives an explicit reception from the MHM 407. In an embodiment, after reception of an indication of the completion of the handover actions from the EMS and the NSMS, the MSRM 309 informs this to MSSM 305 and the RSMCM 307.

Figure 5A:
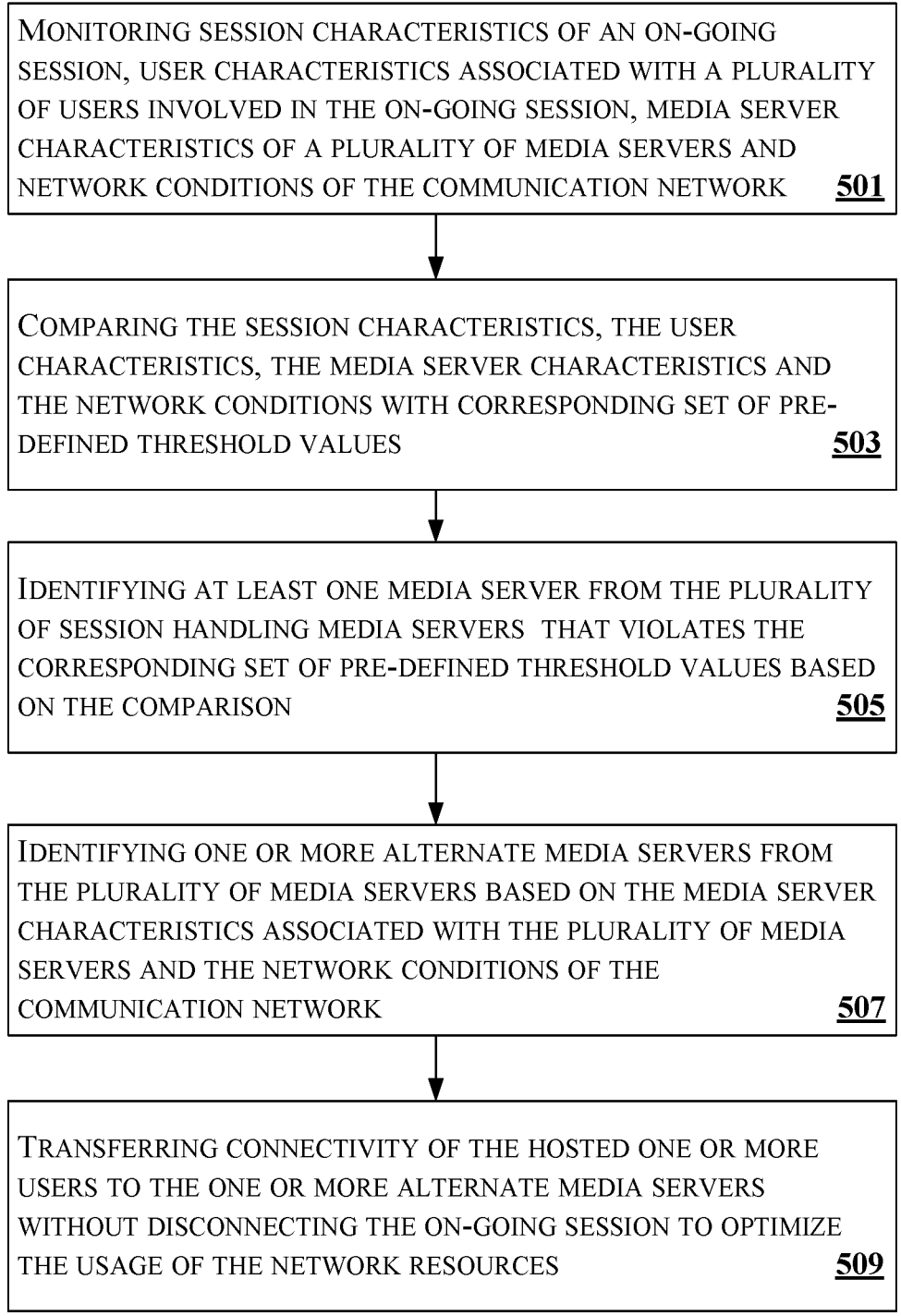
FIG. 5A illustrates a flowchart showing a method for optimizing the usage of network resources in accordance with some embodiments of present disclosure.

FIG. 5A illustrates a flowchart showing a method for optimizing the usage of network resources in accordance with some embodiments of present disclosure.

As illustrated in FIG. 5A, the method 500 comprises one or more blocks for optimizing the usage of network resources. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 501, the MM 303 of the routing server 101 monitors the session characteristics of an on-going session, user characteristics associated with a plurality of users involved in the on-going session, media server characteristics associated with a plurality of media servers, and network conditions of the communication network, received from the PM 301 and RSMCM 307 of the routing server 101. The on-going session is hosted by a plurality of session handling media servers from the plurality of media servers in the communication network.

At block 503, the MM 303 of the routing server 101 compares the session characteristics, the user characteristics, the media server characteristics and the network conditions with corresponding set of pre-defined threshold values. In an embodiment, the set of the pre-defined thresholds are provided by the PM 301 to the MM 303 for performing the comparison.

At block 505, the RSMCM 307 of the routing server 101 identifies at least one media server from the plurality of the session handling media servers that violates the corresponding set of pre-defined threshold values based on the comparison performed by the MM 303. The RMM 301 of the routing server 101 identifies the violation of the pre-defined threshold values referred as RMMPARAMS_TH. The RMM 401 further sends a trigger to the MSSM 305 whenever the violation of the threshold values occurs in order to identify the at least one media server for which the violation occurred. In an embodiment, the at least one identified media server of the plurality of session handling media servers is unable to host one or more users of the plurality of users connected to the identified at least one media server in the on-going session.

At block 507, the MSSM 305 of the routing server 101 identifies one or more alternate media servers from the plurality of media servers based on the media server characteristics associated with the plurality of media servers and the network conditions of the communication network.

At block 509, the MSSM 305 of the routing server 101 transfers connectivity of the hosted one or more users to the one or more alternate media servers without disconnecting the on-going session to optimize the usage of the network resources.

Figure 5B:
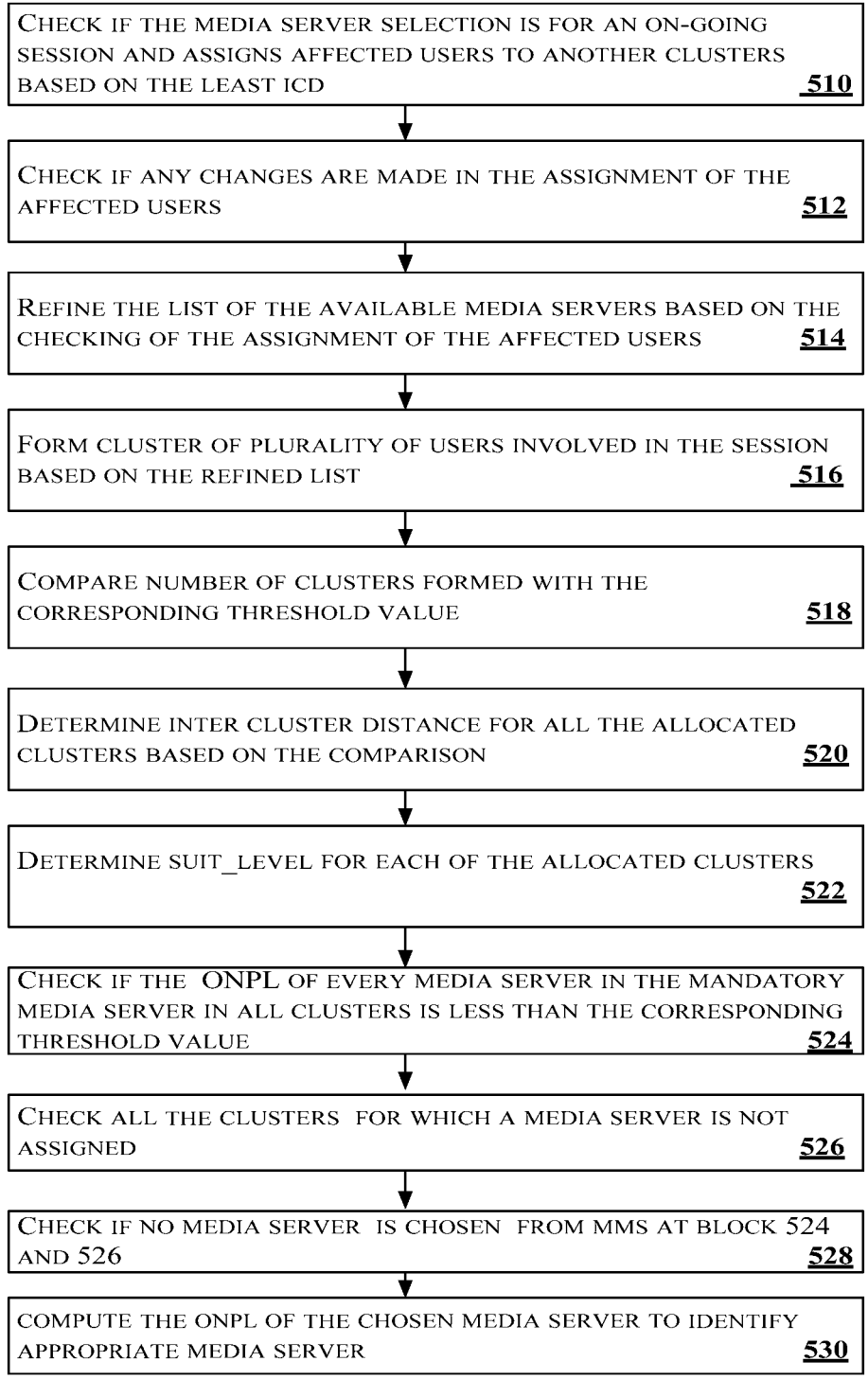
FIG. 5B illustrates a flowchart showing a method for selection of a media server for optimizing the usage of network resources in accordance with some embodiments of present disclosure.

FIG. 5B illustrates a flowchart showing a method for selection of a media server for optimizing the usage of network resources in accordance with some embodiments of present disclosure.

As illustrated in FIG. 5B, the method 500 comprises one or more blocks for optimizing the usage of network resources. The method 500 may be described in the general context of computer executable instructions. Generally, computer executable instructions can include routines, programs, objects, components, data structures, procedures, modules, and functions, which perform particular functions or implement particular abstract data types.

At block 510, the MSSM 305 of the routing server 101 checks if a media server selection is for an on-going session. The checking is performed based on whether the trigger received for selection of appropriate media server is due to inability of a media server in handling the traffic for one or more users (also called affected users), insufficient resources, abnormal condition (for example, route unavailable, network congestion etc.). The MSSM 305 assigns the affected users to another cluster which has the least inter cluster distance from that cluster as explained in FIG. 3.

At block 512, the MSSM 305 of the routing server 101 checks for any changes in the media server assignment for or more affected users based on the assignments of the affected users. If there are no changes and no assignments are carried out, then MSSM 305 checks if the trigger for selection or reselection was for proactive handover of the users or not and perform function as described in block 514, or the MSSM 305 sends information about the new media server which may handle the affected one or more users, who can be handed over.

At block 514, the MSSM 305 of the routing server 101 refines the list of the available media servers received from the RSMCM 307 to create a list of the selectable media servers for the session based on the regulatory policy. In an embodiment, the MSSM 305 also determines the subset of the mandatory media servers to be selected for the session. A media server out of the mandatory media server has to be selected for the session due to regulatory policy (for example, home network routing, LI policy etc.). The MSSM 305 also compares the system resources used and the system resources needed with the system threshold value.

At block 516, the MSSM 305 of the routing server 101 forms clusters of plurality of users involved in the session as explained in FIG. 3, where each clusters contain one or more users.

At block 518, the MSSM 305 of the routing server 101 compares the number of clusters formed at block 516 with the corresponding threshold value. In an embodiment, if the number of clusters is greater than the threshold value, then, the MSSM 305 adapts DIST_THRESH value, define below:

Adapt DIST_THRESH=previous value of DIST_THRESH*DIST_MF_prime

Where DIST_MF_prime=old_DIST_MF*beta
Where old_DIST_MF=most recent historical data of DIST_MF_prime, where initially OLD_DIST_MF=pre-provisional value of DIST_MF
   Where beta=0.8, if number of iterations of reducing clusters for sessions with same number of clusters for last 5 sessions is 1
     =0.9, if number of iterations of reducing clusters for sessions with same number of clusters for last 5 sessions is 2
     =1.0, if number of iterations of reducing clusters for sessions with same number of clusters for last 5 sessions is 3
     =1.1, if number of iterations of reducing clusters for sessions with same number of clusters for last 5 sessions is 4 or 5
     =1.2, if number of iterations of reducing clusters for sessions with same number of clusters for last 5 sessions is 6 or 7 and
     =1.3, otherwise.

At block 520, the MSSM 305 of the routing server 101 determines inter cluster distance for all the allocated clusters using distance between the cluster centres. In an embodiment, if there is only one user in a particular cluster, then an assumption is to made that the user is at the centre of the cluster.

At block 522, the MSSM 305 of the routing server 101 determines SUIT_LEVEL, which is the product of the overall network path length and the number of users in the clusters for each media server from each of the clusters.

At block 524, the MSSM 305 of the routing server 101 checks if the overall network path length of every media server in the mandatory media servers from all the clusters is less than the corresponding threshold value. In an embodiment, if the MMS from all the cluster is more than the corresponding threshold value, the MSSM 305 chooses a media server from the MMS with the least SUIT_LEVEL from a cluster. In case of a tie, if the media server selection is for an on-going session, the MSSM 305 assigns a media server which is already assigned for the session or chooses the media server which can cater to a higher number of users in the cluster.

At block 526, the MSSM 305 of the routing server 101 checks the clusters for which a media server has not been chosen, as described in block 524. In such cases, the MSSM 305 chooses the media server with the least SUIT_LEVEL and which may handle all the users in that cluster. The ability of handling all the users in the clusters is explained in FIG. 3 at MSSM 305.

At block 528, the MSSM 305 of the routing server 101 checks if no media server is chosen from the MMS at block 524 and block 526. On checking, if no media servers are chosen, then the MSSM 305 chooses a media server from the MMS with the least distance from one of the media server chosen at block 526. In case of a tie, the MSSM 305 checks if the media server is for an on-going session, and chooses a media server which is already assigned for the session or chooses the media server which has the least load and the congestion level.

At block 530, the MSSM 305 of the routing server 101 computes the ONPL of the chosen media servers to identify an appropriate media server. The MSSM 305 stores the cluster information, inter cluster distance, ONPL and SUIT_LEVEL information for future reference and also sends the list of the chosen media server and the inter media server distance information to the RSMCM 307.

Figure 6:
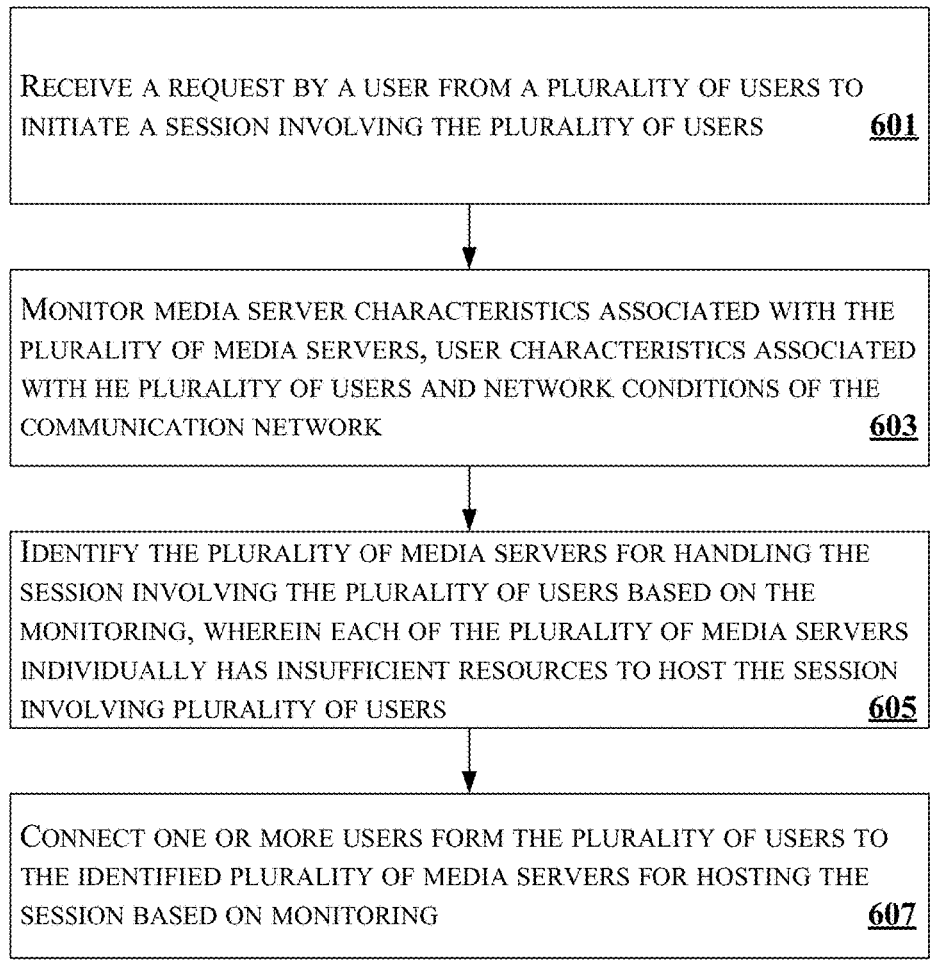
FIG. 6 illustrates a flowchart showing a method for establishing a session using a plurality of media servers in accordance with some embodiments of present disclosure.

FIG. 6 illustrates a flowchart showing a method for optimizing network resources using a plurality of media servers in accordance with some embodiments of present disclosure.

As illustrated in FIG. 6, the method 600 comprises one or more blocks for optimizing network resources using a plurality of media servers. The method 600 may be described in the general context of computer executable instructions. Generally, computer executable instructions can include routines, programs, objects, components, data structures, procedures, modules, and functions, which perform particular functions or implement particular abstract data types.

The order in which the method 600 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

To initiate a session involving for example audio or video session, a user from the plurality of users initiates a session, which involves a plurality of media servers 103.

At block 601, the RSMCM 307 of the routing server 101 receives a request by a user from a plurality of users to initiate a session involving the plurality of users.

At block 603, the routing server 101 monitors the media server characteristics associated with the plurality of media servers, user characteristics associated with the plurality of users and network conditions of the communication network. The media server characteristics of the plurality of media servers and the network conditions are monitored by the RMM 401 of the media server. Further, the user characteristics are monitored by the RSMCM 307.

At block 605, the MSRM 309 of the routing server 101 identifies the plurality of media servers for handling the session involving the plurality of users based on the monitoring and the inputs received from RSMCM 307, where each of the plurality of media servers individually has insufficient resources to host the session involving the plurality of users.

At block 607, the RSMCM 307 of the routing server 101 connects one or more users from the plurality of users to the identified plurality of media servers for hosting the session based on the monitoring.

Computing System

Figure 7:
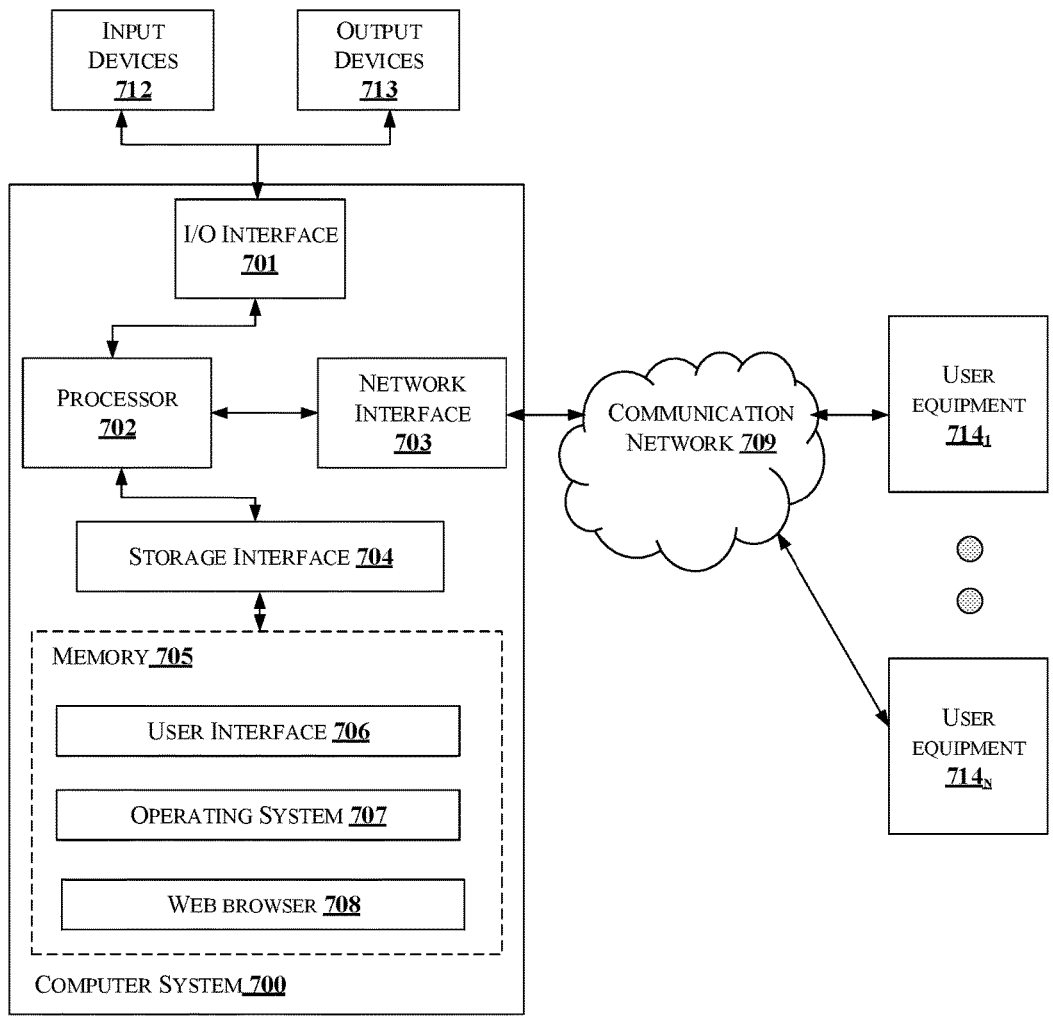
FIG. 7 illustrates a block diagram of an exemplary computer system for implementing embodiments consistent with the present disclosure.

FIG. 7 illustrates a block diagram of an exemplary computer system 700 for implementing embodiments consistent with the present disclosure. In an embodiment, the computer system 700 is used to implement the routing server. The computer system 700 may comprise a central processing unit ("CPU" or "processor") 702. The processor 702 may comprise at least one data processor for optimizing the usage of network resources. The processor 702 may include specialized processing units such as integrated system (bus) controllers, memory management control units, floating point units, graphics processing units, digital signal processing units, etc.

The processor 702 may be disposed in communication with one or more input/output (I/O) devices (not shown) via I/O interface 701. The I/O interface 701 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the computer system 700 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 700 consists of routing server. The processor 702 may be disposed in communication with the communication network 709 via a network interface 703. The network interface 703 may communicate with the communication network 709. The network interface 703 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 709 may include, without limitation, a direct interconnection, local area network (LAN), wide area network (WAN), wireless network (e.g., using Wireless Application Protocol), the Internet, etc. Using the network interface 703 and the communication network 709, the computer system 700 may communicate with the user equipment 714. The network interface 703 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 709 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 702 may be disposed in communication with a memory 705 (e.g., RAM, ROM, etc. not shown in figure) via a storage interface 704. The storage interface 704 may connect to memory 705 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, user interface 706, an operating system 707, web server 708 etc. In some embodiments, computer system 700 may store user/application data 706, such as the data, variables, records, etc. as described in this disclosure. Such databases may be implemented as fault-tolerant, relational, scalable, secure databases such as Oracle or Sybase.

The operating system 707 may facilitate resource management and operation of the computer system 700. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 700 may implement a web browser 708 stored program component. The web browser 708 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 708 may utilize facilities such as AJAX, DHTML, Adobe Flash, JavaScript, Java, Application Programming Interfaces (APIs), etc. In some embodiments, the computer system 700 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 700 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure optimizes the network resources in the communication network.

An embodiment of the present disclosure transfers the connectivity of one or more users of the media servers in a session to a plurality of media server without affecting the quality and connectivity of the session.

An embodiment of the present disclosure dynamically selects one or more alternate media servers for optimal resource usage.

An embodiment of the present disclosure performs fault tolerance in a session by monitoring the plurality of media servers and network conditions.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Routing server |
| 103 | Media servers |
| 105 | User equipment |
| 107 | BTS |
| 109 | BSC |
| 111 | Node B |
| 113 | RNC |
| 115 | eNode B |
| 117 | Packet core |
| 119 | SGSN |
| 121 | GGSN |
| 123 | Evolved packet core |
| 125 | MME |
| 127 | SGW |

-continued

| Reference Number | Description |
| --- | --- |
| 129 | PGW |
| 131 | Communication network |
| 200 | Environment |
| 201 | Clusters |
| 301 | Provisioning module |
| 303 | Monitoring module |
| 305 | Media server selection module |
| 307 | Routing session management and control module |
| 309 | Media server re-configuration module |
| 311 | Signalling module |
| 313 | Other Modules |
| 401 | Resource monitoring module |
| 403 | Media processing module |
| 405 | Signaling module |
| 407 | Media handover module |
| 409 | Other modules |

What is claimed is:

1. A method for optimizing usage of network resources in a communication network, the method comprising:
monitoring, by a routing server, session characteristics of an on-going session, user characteristics associated with a plurality of users involved in the on-going session, media server characteristics associated with a plurality of media servers, and network conditions of the communication network, wherein the on-going session is hosted by a plurality of session handling media servers from the plurality of media servers in the communication network;
comparing, by the routing server, the session characteristics, the user characteristics, the media server characteristics and the network conditions with corresponding set of pre-defined threshold values, wherein the set of pre-defined threshold values are adapted based on average jitter identified from the on-going session and number of iterations required for identifying acceptable number of clusters comprising the plurality of users involved in the on-going session, wherein the plurality of users in the number of clusters are within a pre-defined distance from center of clusters;
identifying, by the routing server, at least one media server from the plurality of the session handling media servers that violates the corresponding set of pre-defined threshold values based on the comparison, wherein the at least one identified media server of the plurality of session handling media servers is unable to host one or more users of the plurality of users connected to the identified at least one media server in the on-going session;
identifying, by the routing server, one or more alternate media servers from the plurality of media servers based on the media server characteristics associated with the plurality of media servers and the network conditions of the communication network; and
transferring, by the routing server, connectivity of the hosted one or more users to the one or more alternate media servers without disconnecting the on-going session to optimize the usage of the network resources.

2. The method as claimed in claim 1, wherein the session characteristics of the on-going session comprises information about session setup procedures, one or more policies associated with the on-going session and type of the on-going session initiated.

3. The method as claimed in claim 1, wherein the user characteristics comprise a first value indicative of a number of the plurality of users in the on-going session, current location of the plurality of users, mobility of the plurality of users, speed and direction of movement of the plurality of users, policies related to the plurality of users, and a second value indicative of a number of users entering the on-going session, and a third value indicative of a number of users exiting the on-going session.

4. The method as claimed in claim 1, wherein the media server characteristics comprises a fourth value indicative of a number of the plurality of session handling media servers used in the ongoing session, information pertaining to system resources present in the plurality of media servers, a fifth value indicative of a number of users handled by the plurality of session handling media servers, a sixth value indicative of a number of the plurality of media servers, information pertaining to occupancy levels of resources on each of the plurality of media servers, inter media server distance, and information associated with the plurality of users handled by the plurality of session media servers.

5. The method as claimed in claim 1, wherein the network conditions comprise policies corresponding to selection of the plurality of session handling media servers and a congestion level of different network segments in the communication network.

6. The method as claimed in claim 1, wherein the comparison is performed upon identifying at least one of entry and exit of the one or more users in the on-going session, initiation and termination of mobility of the one or more users in the on-going session, changes in the media server characteristics, change in speed and direction of movement of the one or more users in the ongoing session, and changes in policies related to one or more users from the plurality of users.

7. The method as claimed in claim 1, wherein the identified one or more alternate media servers satisfy a pre-defined network path length and an optimal usage of network resources in the communication network.

8. The method as claimed in claim 1, further comprising sharing information of transmission delays and network conditions of each of the plurality of media servers with the routing server.

9. The method as claimed in claim 8, further comprising buffering data packets of the on-going session and removing one or more jitters from the on-going session based on the shared information of transmission delay, an inter cluster distance and network conditions of the plurality of media servers.

10. A routing server for optimizing usage of network resources in a communication network, comprising:
a processor; and
a memory communicatively coupled to the processor, wherein the memory stores processor instructions, which, on execution, causes the processor to:
monitor session characteristics of an on-going session, user characteristics associated with a plurality of users involved in the on-going session, media server characteristics associated with a plurality of media servers and network conditions of the communication network, wherein the on-going session is hosted by a plurality of session handling media servers from the plurality of media servers in the communication network;
compare the session characteristics, the user characteristics, the media server characteristics and the network conditions with corresponding set of pre-defined threshold values, wherein the set of pre-defined threshold values are adapted based on average jitter identified from the on-going session and number of iterations required for identifying acceptable number of clusters comprising the plurality of users involved in the on-going session, wherein the plurality of users in the number of clusters are within a pre-defined distance from center of clusters;

identify at least one media server from the plurality of the session handling media servers that violates the corresponding set of pre-defined threshold values based on the comparison, wherein the at least one identified media server of the plurality of session handling media servers is unable to host one or more users of the plurality of users connected to the identified at least one media server in the on-going session;

identify one or more alternate media servers from the plurality of media servers based on the media server characteristics associated with the plurality of media servers and the network conditions of the communication network; and transfer connectivity of the hosted one or more users to the one or more alternate media servers without disconnecting the on-going session to optimize the usage of the network resources.

11. The routing server as claimed in claim 10, wherein the session characteristics of the on-going session comprise information about session setup procedures, one or more policies associated with the on-going session and type of the on-going session initiated.

12. The routing server as claimed in claim 10, wherein the user characteristics comprise a first value indicative of a number of the plurality of users in the on-going session, current location of the plurality of users, mobility of the plurality of users, speed and direction of movement of the plurality of users, policies related to the plurality of users, and a second value indicative of a number of users entering the on-going session, and a third value indicative of a number of users exiting the on-going session.

13. The routing server as claimed in claim 10, wherein the media server characteristics comprises a fourth value indicative of a number of the plurality of session handling media servers used in the on-going session, information pertaining to system resources present in the plurality of media servers, a fifth value indicative of a number of users handled by the plurality of session handling media servers, a sixth value indicative of a number of the plurality of media servers, information pertaining to occupancy levels of resources on each of the plurality of media servers, inter media server distance, and information associated with the plurality of users handled by the plurality of session media servers.

14. The routing server as claimed in claim 10, wherein the network conditions comprise policies corresponding to selection of the plurality of session handling media servers and a congestion level of different network segments in the communication network.

15. The routing server as claimed in claim 10, wherein the processor performs the comparison upon identifying at least one of entry and exit of the one or more users in the on-going session, initiation and termination of mobility of the one or more users in the on-going session, changes in the media server characteristics, change in speed and direction of movement of the one or more users in the on-going session and changes in policies related to one or more users from the plurality of users.

16. The routing server as claimed in claim 10, wherein the identified one or more alternate media servers satisfy a pre-defined network path length and an optimal usage of network resources in the communication network.

17. The routing server as claimed in claim 10, wherein the processor transfers the connectivity of the hosted one or more users to the one or more alternate media servers based on the media server characteristics and network segment congestion level in the communication network.

18. The routing server as claimed in claim 10, wherein the processor is further configured to share information of transmission delays and network conditions of each of the plurality of session handling media servers with each other.

19. The routing server as claimed in claim 18, wherein the processor further comprises buffering data packets of the on-going session and removing one or more jitters from the on-going session based on the shared information of transmission delay, an inter cluster distance between identified acceptable number of clusters and network conditions of the plurality of media servers.

20. A non-transitory computer readable medium including instruction stored thereon that when processed by at least one processor cause a routing server to perform operations comprising:

monitoring session characteristics of an on-going session, user characteristics associated with a plurality of users involved in the on-going session, media server characteristics associated with a plurality of media servers and network conditions of the communication network, wherein the on-going session is hosted by a plurality of session handling media servers from the plurality of media servers in the communication network;

comparing the session characteristics, the user characteristics, the media server characteristics and the network conditions with corresponding set of pre-defined threshold values, wherein the set of pre-defined threshold values are adapted based on average jitter identified from the on-going session and number of iterations required for identifying acceptable number of clusters comprising the plurality of users involved in the on-going session, wherein the plurality of users in the number of clusters are within a pre-defined distance from center of clusters;

identifying at least one media server from the plurality of the session handling media servers that violates the corresponding set of pre-defined threshold values based on the comparison, wherein the at least one identified media server of the plurality of session handling media servers is unable to host one or more users of the plurality of users connected to the identified at least one media server in the on-going session;

identifying one or more alternate media servers from the plurality of media servers based on the media server characteristics associated with the plurality of media servers and the network conditions of the communication network; and transferring connectivity of the hosted one or more users to the one or more alternate media servers without disconnecting the on-going session to optimize the usage of the network resources.

* * * * *